(12) United States Patent
Heikenfeld et al.

(10) Patent No.: US 8,111,465 B2
(45) Date of Patent: Feb. 7, 2012

(54) ELECTROFLUIDIC DEVICES, VISUAL DISPLAYS, AND METHODS FOR MAKING AND OPERATING SUCH ELECTROFLUIDIC DEVICES

(75) Inventors: Jason Heikenfeld, Cincinnati, OH (US); Bo Sun, Rutherford, NJ (US); April Milarcik, Cincinnati, OH (US); George Robertson, Loveland, OH (US); Russell Schwartz, Cincinnati, OH (US)

(73) Assignees: University of Cincinnati, Cincinnati, OH (US); Sun Chemical Corporation, Parsippany, NJ (US)

( * ) Notice: Subject to any disclaimer, the term of this patent is extended or adjusted under 35 U.S.C. 154(b) by 41 days.

(21) Appl. No.: 12/677,653

(22) PCT Filed: Sep. 12, 2008

(86) PCT No.: PCT/US2008/076168
§ 371 (c)(1),
(2), (4) Date: Mar. 11, 2010

(87) PCT Pub. No.: WO2009/036272
PCT Pub. Date: Mar. 19, 2009

(65) Prior Publication Data
US 2010/0208328 A1 Aug. 19, 2010

Related U.S. Application Data

(60) Provisional application No. 60/971,857, filed on Sep. 12, 2007, provisional application No. 61/055,792, filed on May 23, 2008.

(51) Int. Cl.
*G02B 1/06* (2006.01)

(52) U.S. Cl. ........................................ 359/665; 359/666

(58) Field of Classification Search .................. 359/665, 359/666
See application file for complete search history.

(56) References Cited

U.S. PATENT DOCUMENTS
6,568,282 B1 5/2003 Ganzi
(Continued)

FOREIGN PATENT DOCUMENTS
EP 0783122 A2 7/1997
(Continued)

OTHER PUBLICATIONS

Beni, et al., "Electro-wetting displays", Appl. Phys. Lett. 38 (4), Feb. 15, 1981, copyright 1981 American Institutte of Physics, 3 pages.
(Continued)

*Primary Examiner* — Ricky Mack
*Assistant Examiner* — James Jones
(74) *Attorney, Agent, or Firm* — Wood, Herron & Evans, LLP

(57) ABSTRACT

Electrofluidic devices, visual displays formed from the electrofluidic devices, and methods for making and operating such electrofluidic devices Each electrofluidic device has a fluid vessel with first and second regions that contain an electrically conductive polar fluid and a non-polar fluid The polar and/or the non-polar fluids are externally visible external through a viewable area of the second region A voltage source is electrically connected to a capacitor having a hydrophobic surface that contacts the polar fluid and provides a first principal radius of curvature of the polar fluid that is convex and smaller than a second principal radius of curvature of the polar fluid in the first region The voltage source applies an electromechanical force to the polar fluid, thereby transferring the polar fluid from the first region to the second region and causing a spectral property of light transferred through the viewable area to change.

29 Claims, 6 Drawing Sheets

U.S. PATENT DOCUMENTS

| | | |
|---|---|---|
| 6,741,385 B2 | 5/2004 | Ikeda et al. |
| 7,116,467 B2 | 10/2006 | Kornbrekke et al. |
| 2003/0020685 A1 | 1/2003 | Richley et al. |
| 2005/0111842 A1 | 5/2005 | Nakagawa |
| 2005/0151709 A1 | 7/2005 | Jacobson et al. |
| 2006/0077330 A1 | 4/2006 | Ijzerman et al. |
| 2006/0285067 A1 | 12/2006 | Kim |
| 2007/0002455 A1 | 1/2007 | Berge et al. |
| 2007/0040982 A1 | 2/2007 | Nakano et al. |
| 2007/0059510 A1 | 3/2007 | Krupenkin et al. |
| 2007/0146242 A1 | 6/2007 | Miller et al. |
| 2009/0059348 A1* | 3/2009 | Niwano et al. ............... 359/296 |

FOREIGN PATENT DOCUMENTS

| | | | |
|---|---|---|---|
| WO | 2004068208 A1 | | 8/2004 |
| WO | WO 2006129846 | * | 7/2006 |
| WO | 2006129846 A1 | | 12/2006 |
| WO | 2007064141 A1 | | 6/2007 |

OTHER PUBLICATIONS

Hayes, et al., "Video-speed electronic paper based on electrowetting", Nature, vol. 425, Sep. 25, 2003, copyright 2003 nature Publishing Group, 4 pages.

International Searching Authority, International Search Report and Written Opinion issued in related International application No. PCT/US2008/076168 dated Nov. 17, 2008.

Sheridon, N.K., "Electrocapillary Imaging Devices for Display and Data Storage", Xerox Disclosure Journal, vol. 4. No. 3, May 1979, pp. 385-386.

European Patent Office, Supplementary European Search Report issued in related European Application No. EP 08 83 0501 dated Jun. 17, 2011.

* cited by examiner

ELECTROFLUIDIC DEVICES, VISUAL DISPLAYS, AND METHODS FOR MAKING AND OPERATING SUCH ELECTROFLUIDIC DEVICES

CROSS-REFERENCE TO RELATED APPLICATIONS

This application claims the benefit of U.S. Provisional Application Ser. No. 60/971,857, filed on Sep. 12, 2007. This application also claims the benefit of U.S. Provisional Application Ser. No. 61/055,792, filed on May 23, 2008. The disclosure of each of these provisional applications is hereby incorporated by reference herein in its entirety.

BACKGROUND

The present invention relates to electrofluidic devices that provide an optical response for the purpose of altering surface reflectivity, transmission through a surface, or creating 2D images for informational display.

Electrowetting has been a highly attractive modulation scheme for a variety of optical applications. For example, electrowetting has been used to provide optical switches for fiber optics, optical shutters or filters for cameras and guidance systems, optical pickup devices, optical waveguide materials, and video display pixels.

Conventional electrowetting displays include a colored oil that forms a film layer against an electrically insulating fluoropolymer surface. Underneath the fluoropolymer is a reflective electrode constructed from aluminum. This colored oil film layer provides coloration to the reflective surface below. When a voltage is applied between a water layer residing above the oil film layer and the electrode below the fluoropolymer, the oil film layer is broken up as the water electrowets the fluoropolymer. When the voltage is removed, the oil returns to the film layer geometry. While the oil film layer is broken up, the perceived coloration of the surface is that of the reflective electrode (white) whereas, when the oil is in the film state, the perceived coloration is that of the oil. Coloration of the oil is provided by including at least one dye. Conventional electrowetting technology can provide greater than 70% white state and a contrast ratio of up to 10:1.

However, these conventional electrowetting display technologies cannot provide a bistable state in the absence of voltage, have limited white state reflectance (i.e., has difficulty achieving the 80% reflectance of paper), are challenged when creating fully saturated colors, and present manufacturing difficulty because the operating voltage increases as the lateral dimensions of the fluid vessel decreases.

What is needed is a device that uses color fluids without large or multiple voltage source requirements while providing gray-scale switching between a high white state reflectance and fully saturated colors.

SUMMARY

According to one embodiment of the present invention, an electrofluidic device includes an electrically-conductive polar fluid and a non-polar fluid that is immiscible with the polar fluid. The polar and the non-polar fluids differ in at least one optical property. The electrofluidic device also includes a fluid vessel having first and second regions that are in fluidic communication with one another. The second region of the fluid vessel has a smaller principal radius of curvature than the first region and includes a viewable area through which at least one of the polar and the non-polar fluids is visible external to the fluid vessel. A voltage source selectively applies an electromechanical force to the polar fluid. This electromechanical force causes a portion of the polar fluid to move from the first region to the second region of the fluid vessel. A capacitor is included on at least a portion of the second portion and is electrically coupled to the first voltage source. The capacitor includes a hydrophobic surface that provides a first principal radius of curvature of the polar fluid that is convex and that is smaller than a principal radius of curvature of the polar fluid that is within the first region. When the polar fluid is moved by the electromechanical force from the first region to the second region, a spectral property of light transferred through the viewable area changes.

According to another embodiment of the present invention, a bistable electrofluidic device includes an electrically-conductive polar fluid and a non-polar fluid that is immiscible with the polar fluid. The polar and the non-polar fluids differ in at least one optical property. The bistable electrofluidic device also includes a fluid vessel having first and second regions that are in fluidic communication with one another. The second region of the fluid vessel has a smaller principal radius of curvature than the first region and includes a viewable area through which at least one of the polar and the non-polar fluids is visible external to the fluid vessel. A first voltage source is electrically connected to a first capacitor, which is located on a portion of the first region. This first voltage source is operable to move a portion of the polar fluid from the second region to the first region. A second voltage source is electrically connected to a second capacitor, which is located on a portion of the second region. This second voltage source is operable to move a portion of the polar fluid from the first region to the second region. A duct is in fluid communication with the first and second regions and allows non-polar fluid that is displaced from the second region to move through the duct and into the first region. When the polar fluid is moved between the first and second region, a spectral property of light transferred through the viewable area changes.

According to another embodiment of the present invention, a method of making an electrofluidic device is described. The electrofluidic device is formed between first and second substrates and includes a fluid vessel having first and second regions. The method includes filling first and second substrates with a polar fluid. A non-polar fluid is then introduced to the fluid vessel at an edge of the first and second substrates. The non-polar fluid flows between the first and second substrates and removes the polar fluid from at least a portion of the second region. The removal of the polar fluid is assisted by a Young-Laplace pressure of the polar fluid in the second region.

According to another embodiment of the present invention, a method of operating an electrofluidic device is described. The electrofluidic device includes an electrically-conductive polar fluid and a non-polar fluid that is immiscible with the polar fluid. The electrofluidic device also includes a fluid vessel with first and second regions in fluid communication and containing the polar and non-polar fluids. The method includes applying an electromechanical force to the polar fluid in the first region that exceeds a Young-Laplace pressure. This electromechanical force causes at least a portion of the polar fluid to be moved from the first region to the second region of the fluid vessel.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

DETAILED DESCRIPTION

Figure 1A:
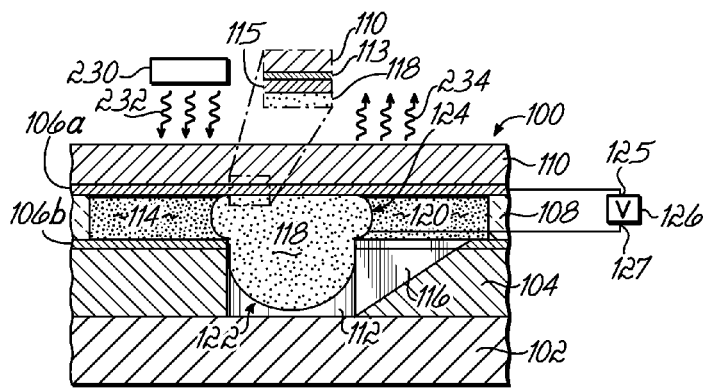
FIG. 1A is a diagrammatic view in partial cross-section of an electrofluidic device according to an embodiment of the invention.

Although embodiments of the invention will be described in connection with certain embodiments, the description of the invention is intended to cover all alternatives, modifications, and equivalent arrangements as may be included within the scope of the appended claims. In particular, those skilled in the art will recognize that the components of electrofluidic device described herein could be arranged in multiple different ways.

An electromechanical force on a conductive fluid on an electrical insulator underlies the physical mechanism for one embodiment of the present invention. This electromechanical force originates near a line of contact between a conductive fluid and a capacitor and is proportional to electrical capacitance times the square of the voltage applied. The electromechanical force is generally oriented such that the force is directed outward from the exposed surface of the fluid. This arrangement provides high-speed operation (on the order of milliseconds), low power capacitive operation (about 10 mJ/m$^2$), and excellent reversibility. However, alternative embodiments of the present invention include other fluid manipulation methods well-known by those skilled in the art of microfluidics. These alternate methods include, but are not limited to, electrowetting without insulators, thermocapillary, photo-responsive molecules such as spiropyrans, dielectrophoresis, and micro-electro-mechanical pumping.

A Cartesian coordinate system will be used to define specific directions and orientations. References to terms such as 'above', 'upper', and 'below', 'lower', are for convenience of description only and represent only one possible frame of reference for describing the invention. The dimensions of devices described herein cover a wide range of sizes from nanometers to meters based on the application. Terms such as visible will be used in some cases to describe a person or machine vision system or other optical source or detector that is facing towards the upper surface of the embodiments described herein.

The term liquid or fluid is used herein to describe any material or combination of materials that is neither solid nor plasma in its physical state. A gas may also be considered as a fluid so long as the gas moves freely according to the principles of the present invention. Solid materials, such as liquid powders, can also be considered a liquid so long as they move freely according to the principles of the present invention. Liquids or fluids can also contain any weight percent of a solid material so long as that solid material is stably dispersed in the liquid or fluid. The term liquid is not confining to any particular composition, viscosity, or surface tension. Unless otherwise noted, the terms concave and convex refer to the geometry associated with the smallest radius of curvature along a meniscus, it being understood that other larger radius of curvatures on a meniscus can be oppositely concave or convex, but having a weaker influence on the Young-Laplace pressure of the meniscus.

With reference to FIG. 1A an electrofluidic device 100 is illustrated and comprises a first substrate 102, a mesa 104, at least one capacitor 106 having a hydrophobic surface, a spacer 108, a second substrate 110, a fluid vessel including first and second regions 112, 114, a duct 116, a first fluid that can be a polar fluid 118, a second fluid that can be a non-polar fluid 120, and an energy source. The non-polar fluid 120 is immiscible with the polar fluid 118 and thus occupies space within the fluid vessel that is not occupied by the polar fluid 118. The first and second regions 112, 114 of the fluid vessel have a fluidic connection such that the polar fluid 118 can move between the first and second regions 112, 114. The polar fluid 118 within the first and second regions 112, 114 will have at least two surfaces 122, 124 that exhibit a convex curvature so long as the first and second regions 112, 114 are suitably hydrophobic. Each convex surface 122, 124 will exhibit an inward Young-Laplace pressure according to $\Delta p = \gamma/R$ where $\gamma$ is the interfacial surface tension between the polar fluid 118 and non-polar fluid 120 and R is the principle radius of curvature of the convex portions 122, 124 of the polar fluid 118. A meniscus can have more than one radius of curvature R, in which the net effect of the radii of curvatures is given as $(1/R_1 + 1/R_2 + \ldots)$. Thus, in the electrofluidic device 100, if the first and second regions 112, 114 have similar surface energies, then the first region 112 will always impart a larger R than the second region 114 will impart onto the polar fluid 118. Therefore a net Young-Laplace pressure directs the polar fluid 112 into the first region 112 and the polar fluid 118 favors occupation of the first region 112 at equilibrium.

As illustrated in FIG. 1, the electrofluidic device includes two capacitors 106a, 106b, each having a hydrophobic surface contacted by the polar fluid 118. As is further shown in the insert of FIG. 1, the capacitor includes a conductive electrode 113 and a dielectric coating 115. Either of the polar fluid 118 or the electrode 113 of the capacitors 106a, 106b can act as electrical ground or a bias electrode. While the electrofluidic device 100 can be operated with either one of capacitor 106a on the second substrate 110 or the capacitor 106b on the surface of the mesa 104, the use of both capacitors 106a, 106b will approximately double the electromechanical force at a given voltage, and therefore result in a lower required operating voltage for the electrofluidic device 100. Generally the capacitor 106 should provide a stored energy between about 1 mJ/m$^2$ and about 100 mJ/m$^2$.

The electrode 113 of the capacitor 106 is formed from the combination of any electrically conductive material coated by any electrically insulating and hydrophobic dielectric coating 115. The material of the electrode 113 can be carbon, organic PEDOT-PSS, $In_2O_3$:$SnO_2$, aluminum, or any other material that is electrically conductive and in some cases exhibits a certain optical property such as optical absorption, reflection, or transmission. The dielectric material coating 115 that partially comprises the capacitor can be any material that is suitably electrically insulating at the voltages required for operation of the electrofluidic device 100, and any material that imparts a convex meniscus on polar fluid 118. Since the non-polar fluid 120 can be oil, even conventional polymers may be suitable dielectric material. A preferred material would be a fluoropolymer, as it promotes a highly-convex geometry on the polar fluid 118, has small wetting hysteresis, and is highly chemically inert. Suitable fluoropolymers include Asahi Cytop, Cytonix Fluoropel, and DuPont Teflon AF, to name a few. It is generally preferred that the fluoropolymer be less than about 1 μm in thickness to allow for low voltage operation of the capacitor 106. A thinner fluoropolymer provides a higher electrical capacitance and therefore require less voltage to achieve the electromechanical force for flow of the polar fluid 118. However, a thinner fluoropolymer is more susceptible to electrical breakdown, therefore a high breakdown field dielectric (not shown) such as $Si_3N_4$ or $Al_2O_3$ may be inserted between the dielectric coating 115 and the electrode 113 to promote high electrical capacitance and electrical reliability.

FIG. 1A further illustrates the energy source, which can be a voltage source 126, operable to provide a stimulus and alter the appearance of the electrofluidic device 100, as will be described in detail below. The voltage source 126 can be analog, digital, a battery, a direct current voltage source, an alternating current voltage source, the drain electrode of a thin-film-transistor, or any source suitable electrical source for applying the stimulus to the polar fluid 118. Suitable voltage sources 126 are well known by those skilled in the art of voltage driven devices based on dielectrophoresis, electrowetting, liquid crystals, and micro-electromechanics. A first terminal 125 of the voltage source 126 is electrically connected to the electrode 113 of the capacitor 106a while a second terminal 127 of the voltage source 126 is electrically connected to the polar fluid 118. Alternatively, the first terminal 125 of the voltage source 126 may also connect to the capacitor 106b, as previously explained, and thereby doubling the total electromechanical force that can be applied to the polar fluid 118. The dielectric coating 115 can electrically insulate the first and second terminals 125, 127 of the voltage source 126. The electrical connection between the terminal 127 and the polar fluid 118 can be a wire or a conductive coating formed on a surface of the electrofluidic device 100 suitable to maintain voltage connection with the polar fluid 118 for all positions of the polar fluid 118 in the first or second regions 112, 114.

Because the polar fluid 118 is electrically conductive, the two capacitors 106a, 106b can also be driven in series wherein the first terminal 125 of the voltage source 126 is electrically connected to the capacitor 106a adjacent to the upper substrate 110, the second terminal 127 of the voltage source 126 is connected to the capacitor 106b adjacent to the lower substrate 102, and the polar fluid 118 is electrically floating but provides an electrical connection between the capacitors 106a, 106b. This approach may simplify electrical connection, but will require a higher voltage in order to provide a suitable electromechanical force for movement of the polar fluid 118.

Figure 1B:
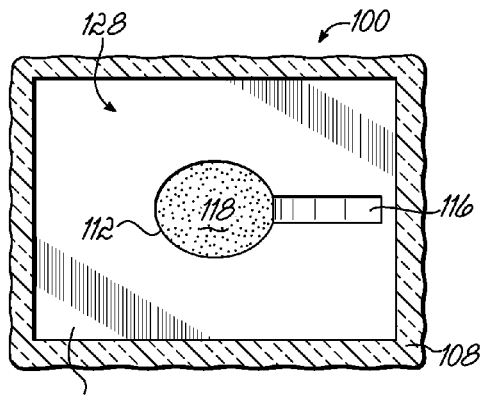
FIGS. 1B and 1C are top views of the electrofluidic device of FIG. 1A.

As best shown in FIG. 1B the second region 120 includes a viewable area 128 through which the polar fluid 118 and the non-polar fluid 120 are visible external to the electrofluidic device 100. The first region 112 has a geometry that imparts onto the polar fluid 118 a larger principle radius of curvature and occupies a smaller portion of the viewable area 128. The second region 114 has a geometry that imparts onto the polar fluid 118 a smaller principle radius of curvature and occupies a larger portion of the viewable area 128. Thus, as shown at equilibrium the polar-fluid 118 will occupy the first region 112 and thus only a fraction of the viewable area 128.

It is well known to those skilled in the art of electrofluidics that applying a stimulus, such as a voltage, between a conductive fluid (the polar fluid 118) and the electrode of the capacitor 106a (FIG. 1A) will create an electromechanical force that is directed away from the conductive fluid. That electromechanical force is operable to cause the conductive fluid to advance over the surface of the dielectric coating 115 (FIG. 1A) over the electrode 113 (FIG. 1A). Thus, alteration to the appearance of the viewable area 128 of the electrofluidic device 100 of the present embodiment is governed by electromechanical force and not by the contact angle as in conventional devices.

With continued reference to FIGS. 1A-D, the materials and construction of the electrofluidic device 100 is now reviewed in greater detail. It should first be noted that the materials and features presented are not a limited set, rather, the materials and features presented herein merely form an example set with which operation of the electrofluidic device may be performed. Numerous alternate or additional materials and features are easily perceived by one skilled in the art of electrofluidics or electronic displays, and the present invention therefore includes such obvious improvements or alternative embodiments.

The first substrate 102 is any substrate that is suitable for providing the degree of rigidity, flexibility, rollability, or conformability, desired in a given application for the electrofluidic device 100. Furthermore the first substrate 102 may provide a hermetic seal for the electrofluidic device 100. The second substrate 110 may provide similar functionality as the first substrate 102. At least the first substrate 102 or second substrate 110 should be suitably transparent to form the viewable area 128 and thereby allow the polar fluid 118 and/or non-polar fluid 120 to be viewable at the desired wavelength(s) of light, in some cases including those outside the visible range of light. Non-limiting examples for the substrates include Corning 1737 glass, soda-lime glass, polymer substrates, textiles, metal foils, or semiconductor wafers, to name a few.

The mesa 104 may be formed from any material that is able to impart the desired feature geometries for operation of the electrofluidic device 100. Geometries described herein are the first region 112 and the duct 116, but are not so limited. As such, the first region 112 and the duct are considered to be unitary, that is, the duct 116 and the first region 112 are formed as a unitary construction within the material of the mesa, or from a common layer of material using the same or similar processes for formation. This unitary construction is preferred as it allows conventional planar manufacturing and microfabrication techniques to be used in making liquid crystal displays, computer chips, and the like; however, other methods may be used. Unitary construction allows for use of flexible substrates and eliminates problems encountered with alignment of such substrates. Furthermore, unitary construction allows the present invention to function with use of only two substrates and not an intermediate substrate, thus simplifying fabrication and maximum optical performance.

The mesa 104 could be part of the first substrate 102, with the mesa 104 being formed by an etching process or by microreplication or molding. The mesa 104 could be a distinct polymer that is photolithographically added onto the first substrate 102, a suitable example being Microchem SU-8 or KMPR negative-tone photoresists. An example means by which the mesa thickness can be determined is by calculation of contrast ratio for the electrofluidic device. If the first region 112 is one-tenth of the viewable area 128, a visual contrast ratio of about 1:10 could be achieved for the electrofluidic device. This would require that the mesa 104, and therefore the first region 112, to be about 10 times thicker than the height of second region 114 (i.e. the volumes of the first and second regions 112, 114 being similar). Generally, the second region 114 should have at least twice the surface area-to-volume ratio as the first region 112.

The duct 116 can be the absence of the mesa material. The duct 116 can alternatively be any feature, including geometrical alterations of the first region 112, that promotes ease of fluid flow or improved reproducibility of flow of the fluids. Counter fluid movement via the duct 116 increases the speed of fluid movement and improves regularity of the direction of fluid movement within the electrofluidic device 100. In this way, the electrofluidic device 100 is highly manufacturable by having few fabrication steps and only requiring the alignment of features to the first substrate 102. Based on the geometry of the duct 116, the polar fluid 118 may or may not occupy the duct 116 at equilibrium.

The spacer 108 serves the role of regulating the height of the second region 114 and/or the role of terminating the advancement of the polar fluid 118 into the second region 114. Spacer materials can be any material that is sufficiently rigid or flexible. For high-contrast display applications the spacer 108 may be formed from a black or white colored material or for transmissive applications the spacer 108 may be transparent. As is commonly used in rollable or flexible displays, the spacer 108 may also serve the role of physically adhering features on the first substrate 102 to features on the second substrate 110.

The polar fluid 118 can be comprised of a carrier liquid and a pigment dispersed within the carrier liquid and has a differential Young-Laplace pressure ranging from about 0.02 $N/cm^2$ to about 10 $N/cm^2$ when the polar fluid 118 simultaneously contacts the coating of the capacitor 106 and the non-polar fluid 120. It is generally preferred that the carrier liquid, dyes soluble in the carrier liquid, or the pigment will provide an optical absorption or reflection at a given band of optical wavelengths so as to provide an optical effect, which will be described in detail below.

The carrier liquid is typically a polar fluid such as water, alcohol, polyols, CELLOSOLVES, CARBITOLS, glycols, ether alcohols, aliphatic alcohols, ethers, ketones, chlorinated hydrocarbons, pyrrolidones, polar aprotics, aldehydes, acetates, polyglycols, plasticizers such as phthalates, or mixtures thereof. The pigments can be in amounts ranging from about 0.1% weight to about 40% weight, based on the total weight of the pigment dispersion. Particles comprising the pigment dispersion can have a mean weight diameter value ranging from about 10 nm to about 500 nm and include azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof.

For the case of the polar fluid 118 in the second region 114, the pigment provides a color saturation corresponding to a minimum Maxwell triangle of (0.3, 0.4), (0.4, 0.3), (0.3, 0.3) as depicted on a 1931 CIE Chromaticity diagram.

The polar fluid 118 can also contain various additives, such as surfactants, to lower the interfacial surface tensions. Suitable surfactants include anionic, cationic, catanionic, nonionic, and zwitterionic surfactants, such as sulfonates, phosphonates, ethylene oxides and propylene oxides containing a hydrophobic head, block and random co-polymers, alkyl amines such as primary, tertiary, and quaternary amines, pyrrolidones, naphthalene condensates, alkynes, carboxylic acids, amines, or mixtures thereof.

The polar fluid 118 may further contain resins, i.e. ionic polymers such as acrylics, styrene-maleics, styrene-acrylics, styrene maleic acid amides, quaternary salts or mixtures thereof. Nonionic polymers may also be appropriate, especially EO/PO units.

The polar fluid 118 may further contain humectants, such as those taught in U.S. Pat. No. 7,160,933, incorporated by reference herein in its entirety, or monohydric alcohols with carbon chains greater than about 10 carbon atoms, such as decanol, dodecanol, oleoyl alcohol, stearoyl alcohol, hexadecanol, eicosanol, polyhydric alcohols, such as ethylene glycol, alcohol, diethylene glycol (DEG), triethylene glycol, propylene glycol, tetraethylene glycol, polyethylene glycol, glycerol, 2-methyl-2,4-pentanedio, 2-ethyl-2-hydroxymethyl-1,3-propanediol (EHMP), 1,5-pentanediol, 1,2-hexanediol, 1,2,6-hexanetriol and thioglycol; lower alkyl mono- or di-ethers derived from alkylene glycols such as ethylene glycol mono-methyl or mono-ethyl ether, diethylene glycol mono-methyl or mono-ethyl ether, propylene glycol monomethyl or monoethyl ether, triethylene glycol mono-methyl or mono-ethyl ether, diethylene glycol di-methyl or di-ethyl ether, poly(ethylene glychol) monobutyl ether (PEGMBE), and diethylene glycol monobutylether (DEGMBE); nitrogen-containing compounds such as urea, 2-pyrrolidinone, N-methyl-2-pyrrolidinone, and 1,3-dimethyl-2-imidazolidinone;

and sulfur-containing compounds such as dimethyl sulfoxide and tetramethylene sufone; and mixtures thereof.

The polar fluid 118 can further contain chemicals, such as miscible fluids or salts to further stabilize the dispersion and/or to alter the boiling or freezing point of the first fluid. The pigments preferably are stabilized by incorporation of dispersing polymers, dispersing agents, synergists, surfactants, surface treatment, or encapsulation.

Surfactants, dispersants, resins, or combinations thereof within the polar fluid 118 can be in amounts ranging from about 0.1% to about 200% by weight, based on the weight amount of the pigment.

In some embodiments, the polar fluid 118 may support one or more distinct phases.

In preparing the polar fluid 118, the components are premixed in a vessel equipped with a high-speed stirrer. The mixture may then be passed through a rotating ball mill or agitated media mill, which may be batch operation or by way of recirculation and/or discrete pass, containing media such as glass, ceramic, steel, or organic polymer that is about 30 µm to about 5.1 cm in size. Typical mills include those manufactured by Eiger, Netzsch, Buhler, Premier, Chicago Boiler, Drais, Union Process, etc. Alternatively, dispersions may be produced on batch process equipment such as a rotating ball mill or an agitated ball mill such as stirring. The former is typified by those provided by Paul-O-Abbe; the latter is typified by those supplied by Union Process. Media size for either may range in size noted above, and media shape may be circular, regular, irregular, or a mixture thereof. The dispersion may also be prepared on any high-energy disperser with a shear mechanism such as an IKA Works, Baker-Perkins, etc., sigma blade mixer. The dispersion is optionally filtered (or centrifuged) to remove large particles such as undispersed particles, media, or contaminants is any fluid that is adequately electrically conductive and which achieves a convex meniscus inside the second region.

The polar fluid 118 should have a surface tension ranging from about 5 dynes/cm to about 80 dynes/cm and a viscosity of less than about 100 cp. When the polar fluid 118 is located within the second region 114, the polar fluid will be characterized by a minimum transmission of less than about 30% or a minimum reflection of less than about 30%.

The second fluid, i.e. the non-polar fluid 120, should be immiscible with the polar fluid 118, and further should not form an emulsion with the polar fluid 118. The non-polar fluid 120 can be comprised of alkanes, silicone oil, fluorosolvents, gases, or mixtures thereof. Generally, oil is preferred as it reduces the effects of gravity and contact angle hysteresis, can increase the Young's contact angle of the polar fluid 118, can properly electrically insulate the space not occupied by the polar fluid 118, and therefore allows freedom of movement of fluids between the first and second regions 112, 114. In some embodiments, such as electronic paper applications, the non-polar fluid 120 can be white in color, i.e. a solution of a high refractive index metal-oxide dispersion within a low refractive index oil or a non-miscible liquid inside the oil. The non-polar fluid 120 will have a cross-solubility level with the polar fluid 118 that is less than about 10% and preferably less than about 1%. Further, the non-polar fluid 120 should have an interfacial tension value with deionized water of about 2 dynes/cm to about 60 dynes/cm and a viscosity of less than about 100 cp.

The non-polar fluid 120 can further contain a colorant, including soluble dyes, organic pigments, inorganic pigments, or combinations thereof. Suitable pigments include those having an average particle size, indicated by a mean weight diameter, of about 10 nm to about 500 nm. These include azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof. The colorant can comprise an amount of about 0.1% to about 40% by weight based on the total weight of the pigment.

In some embodiments, the colorant can be a material that has a refractive index that differs from the refractive index of the non-polar fluid 120 by at least 0.05. In this way, the colorant will impart a diffuse white color onto the non-polar fluid 120.

Before dispersing the pigment within the non-polar fluid 120, the pigment particles can be pre-treated by dispersing the pigment within a non-polar fluid in the presence of at least one dispersant and optionally a synergist and/or UV absorbers. UV absorbers include those taught in U.S. Pat. Nos. 7,066,990 and 7,018,454, incorporated herein in their entirety, as well as hydroxyphenylbenzotriazoles; tris-aryl-s-triazines; benzophenones; α-cyanoacrylates; oxanilides; benzoxazinones; benzoates; α-alkyl cinnamates; 5-chloro-2-(2-hydroxy-3,5-di-tert-butylphenyl)-2H-benzotriazole; 2-(2-hydroxy-3,5-di-tert-butylphenyl)-2H-benzotriazole; 2-(2-hydroxy-3,5-di-tert-amylphenyl)-2H-benzotriazole; 2-(2-hydroxy-3,5-di-α-cumylphenyl)-2H-benzotriazole; 2-(2-hydroxy-3-α-cumyl-5-tert-octylpheny1)-2H-benzotrizole; 2-(2-hydroxy-5-tert-octylphenyl)-2H-benzotrizole; 2-(2-hydroxy-5-methylphenyl)-2H-benzotriazole; 2-(2-hydroxy-3-tert-butyl-5-methylphenyl)-2H-benzotriazole-5-sulfonic acid, sodium salt; 3-tert-butyl-4-hydroxy-5-(2H-benzotriazol-2-yl)-hydrocinnamic acid; 12-hydroxy-3,6,9-trioxadodecyl-3-tert-butyl-4-hydroxy-t-(2H-benzotriazol-2-yl)-hydro-cinnamate; octyl-3-tert-butyl-4-hydroxy-5-(2H-benzotriazol-2-yl)-hydrocinnamate; 2-(3-t-butyl-2-hydroxy-5-(2-omega-hydroxy-octa-(ethyleneoxy)carbonyl-ethyl)-phenyl)-2H-benzotriazole; 4,6-bis(2,4-dimethylphenyl)-2-(4-octyloxy-2-hydroxyphenyl)-s-triazine; 2,4-bis(2-hydroxy-4-butyloxyphenyl)-6-(2,4-bis-butyloxyphenyl)-1,3,5-triazine; 2-[4-(dodecyloxy/tridecyloxy-2-hydroxypropoxy)-2-hydroxyphenyl]-4,6-bis(2,4-dimethylpheny)-1,3,5-traizine; the reaction product of tris(2,4-dihydroxyphenyl)-1,3,5-triazine with the mixture of α-cholorpropionic esters (made from isomer mixture of C7 or C9 alcohols); 2,4-dihydroxybenzophenon; 2,2',4,4'-tetrahydroxy-5,5'-disulfobenzophenone, disodium salt; 2-hydroxy-4-octyloxybenzophenone; 2-hydroxy-4-dodecyloxybenzophenone; 2,4-dihydroxybenzophenone-5-sulfonic acid and salts thereof, 2-hydroxy-4-methoxybenzophenone-5-sulfonic acid and salts thereof; 2,2'-dihydroxy-4,4'-dimethoxybenzophenone-5,5'-disodium sulfonate; 3-(2H-benzotriazol-2-yl)-4-hydroxy-5-sec-butyl-benzenesulfonic acid, sodium salt; and 2-(2'-hdyroxy-3'-tertbutyl-5'-polygycolpropionate-phenyl)benzotriazole; and mixtures thereof.

The non-polar fluid 120 may also include a dispersant to stabilize the pigment particle in the solution or to aid in the dispersion process. Appropriate dispersants can include those having hydrophobic or hydrophilic properties. In some instances, the dispersant will include a synergist, or a derivative of the colored pigment, to further stabilize the pigment dispersion. Synergists can be synthesized separately and added to a dispersion, formed directly on the pigment as in U.S. Pat. Nos. 6,911,073 and 5,922,118, incorporated herein in their entirety, or formed during the manufacture of the pigment as in U.S. Pat. Nos. 5,062,894 and 5,024,698. The total amount of dispersant within the second fluid can typically be an amount of about 0.1% to about 200% by weight, based on the weight of the pigment. The synergist can be in the amount of about 0% to about 200% by weight, based on the weight of the pigment.

Preparation of the non-polar fluid 120 begins with premixing the dispersant and the non-polar fluid in a vessel equipped with a high-speed stirrer. The mixture is then passed through a rotating ball mill or agitated media mill which may be a batch operation or by way of recirculation and/or discrete pass, containing media such as glass, ceramic, steel, or organic polymer that is about 30 µm to about 5.1 cm in size. Typical mills are those manufactured by Eiger, Netzsch, Buhler, Premier, Chicago Boiler, Drais, Union Process, etc. Alternatively, the dispersions may be produced on batch process equipment, such as a rotating ball mill or agitated ball mill, such as stirring. The former is typified by those provided by Paul-O-Abbe; the latter is typified by those supplied by Union Process. Media size for either may range in size noted above and the shape may be circular, regular, irregular, or combinations thereof. Equally, the dispersion may be prepared on any high energy disperser with a shear mechanism such as an IKA Works, Baker-Perkins, etc., sigma blade mixer. The dispersion is optionally filtered or centrifuged to remove large particles such as undispersed particles, media, or contaminants.

Moving now to FIGS. 1A-1D to illustrate one method of moving the polar fluid 118 and thereby altering the appearance of the electrofluidic device 100. A stimulus is applied by the voltage source 126 between the polar fluid 118 and the electrode of the capacitor 106a. Once a sufficient voltage, i.e. a threshold, is reached, the electromechanical force is created and pulls the polar fluid 118 from the first region 112 and into the second region 114 of the fluid vessel, thereby increasing the amount of polar fluid 118 occupying the viewable area 128. This occurs as soon as the electromechanical force (per unit area) exceeds the Young-Laplace pressure (force per unit area) and other effects such as contact angle hysteresis. Based on the geometry of the second region 114, the interfacial surface tension between the polar fluid 118 and non-polar fluid 120, and contact angle hysteresis, it is possible to determine that this threshold for polar fluid flow into the second region 114 is in the range of about 0.02 N/cm$^2$ to about 10 N/cm$^2$. If the electromechanical force is suitably lowered below this threshold, the polar fluid 118 will retract back into the first region 112 of the fluid vessel due to the influence of the Young-Laplace pressure. The viscosity of the polar fluid 118 and the non-polar fluid 120, in combination with the electromechanical force, can result in a speed of transfer of the polar fluid 118 that is greater than about 0.1 cm/s.

In an alternative embodiment of the present invention the first and second regions 112, 114 of the fluid vessel could have similar geometries but different surface energies, and therefore different contact angles, such that the effect described above could occur.

Conventional electrowetting displays based on colored oil films experience an increase in required operating voltage as the lateral dimensions of a cell are reduced. For the electrofluidic device 100 there is no penalty in the form of needing higher voltage for smaller scale devices, and thus the electrofluidic device 100 is simultaneously scalable to high resolution pixels and low voltage operation.

The electrofluidic device, as shown in FIGS. 1A-1D can also create gray-scale levels. Conventional micro-electromechanical systems are almost always stable in one of only two states, meaning that the device must be pulse-width modulated or spatially dithered to achieve gray-scale. Yet, as a voltage level is held constant over time the liquid crystal device will settle into a given gray-scale state determined by the magnitude of applied voltage. For electrowetting displays, voltage response is somewhat similar to liquid crystal displays. Electrophoretic displays involve charged pigment mobility in an electric field, the larger the applied voltage, the higher the contrast for the final gray-scale state. However, in the present embodiment, when the voltage source 126 of the electrofluidic device is operated above the threshold for wetting polar fluid into the second region, the polar fluid 118 will maximally fill the second region 114 and a maximum perceived color change is achieved for the fluid vessel 100 as in FIGS. 1C and 1D. When the stimulus from the voltage source 126 is suitably below threshold for wetting polar fluid 118 into the second region 114, the polar fluid 118 will maximally exit the second region 114, and again, a maximum perceived color change is achieved for the device, as in FIGS. 1A and 1B. Therefore unlike conventional devices, there is no stable gray-scale state based on the magnitude of applied voltage on the electrofluidic device 100. However, as will be taught, stable gray states can be created by modifying the features, materials, or coatings of the electrofluidic device 100.

The effects of contact angle hysteresis, non-planar surface geometry of any coating on the walls of the first or second regions 112, 114, or the incomplete covering of the electrode 113 with the dielectric material 115, will cause a range of voltages within which the net force on the polar fluid 118 is insufficient for advancement into or retraction from the second region 114 but can be utilized to hold the polar fluid 118 in an intermediate filling position within the second region 114. Thus, one manner of achieving gray-scale with the electrofluidic device 100 is to use polar and non-polar fluids 118, 120 with suitable viscosities such that there is a controllable or predictable velocity for the polar fluid 118 as it advances or retracts from the second region 114. As a result, this velocity of advancement or retraction would depend on the applied voltages (i.e. the net difference between the Young-Laplace pressure and the applied electromechanical force per unit area) and can be pulse-width or voltage modulated to a given position in the second region 114. The gray-scale level can then held stable at that position using a voltage that is near the threshold for fluid movement but within a range that contact angle hysteresis prevents fluid movement. This held position could be modulated from gray-scale state to gray-scale state, or the fluid positions reset to either extreme position and a gray-scale state then selected. Furthermore for the case of an electrical bias that is periodically refreshed, the bias need not be symmetric and a constantly moving retraction or advancement of fluids is possible, and if the movement is fast enough such that the perceived gray-scale state will be a time-averaged response of the constantly changing gray-scale state. In this method of operation, because the polar fluid 118 is acting as a variable area electrode on the capacitor 106a, the electrical capacitance that is driven by the voltage source 126 will vary with the position of the polar fluid 118 within the second region 114. Therefore gray-scale states are selected by providing a suitable amount of electrical charge to the device and not by voltage modulation or pulse-width modulation of voltage.

In an alternative embodiment of the present invention, one or more small ridges (not shown) or changes in electrode patterns could be utilized to create small energy barriers to fluid movement, and gray-scale state stability thereby improved. This may aid in high-speed and reduced error gray-scale switching, since further intermediate gray-scale reset positions may be created by locally modifying the composition or geometries of the solid materials at or near the surface of the second region 114. It is readily understood by one skilled in the art of displays that active matrix, passive matrix, or segmented voltage addressing would allow multiple such means of addressing the electrofluidic device, those addressing means captured within the spirit of the description of the unique electrical response of the electrofluidic device.

Figure 2A:
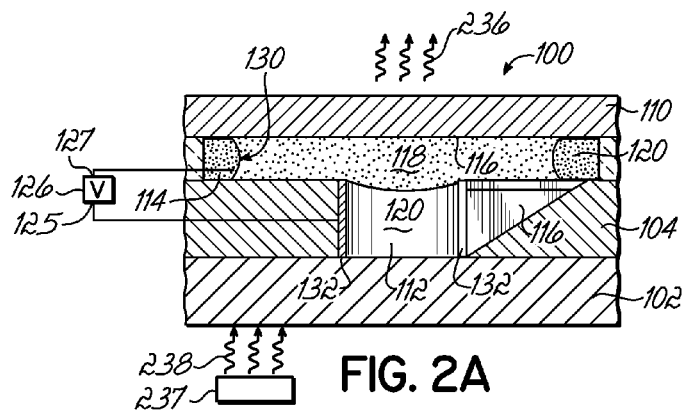
FIGS. 2A and 2B are diagrammatic views in partial cross-section of an alternative method of operating the electrofluidic device of FIGS. 1A and 1D.
Figure 2B:
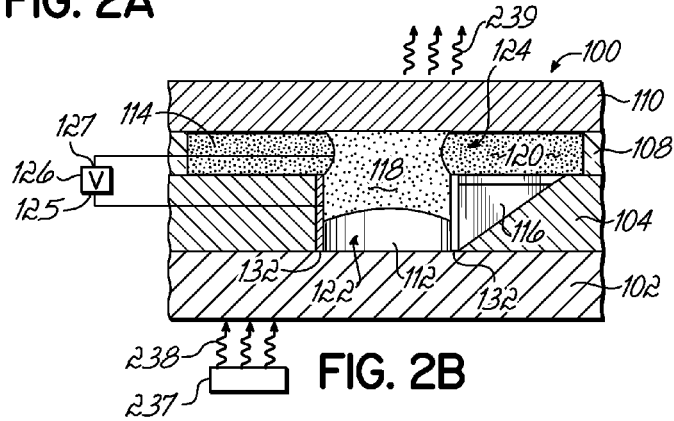

Turning now to FIGS. 2A and 2B, illustrating yet another method of operating the electrofluidic device 100. Specifically, FIG. 2A illustrates that the materials of the electrofluidic device 100 can be selected such that the polar fluid 118 exhibits a concave meniscus 130 in second region 114, and therefore will flow into the second region 114 even without the electromechanical force. For this alternative embodiment the first terminal 125 of the voltage source 126 will be electrically connected to the electrode (not shown) of capacitor 132, which is on the surface of the first region 112. In this way, the capacitor 132 is operable to pull the polar fluid 118 out of second region 114 and into the first region 112, as in FIG. 2B. This alternative embodiment is less favorable in terms of switching speed, voltage requirements, and other practical factors from an applications standpoint.

The electrofluidic device 100 can be operated under different modes, as shown in FIGS. 1A-1D and FIGS. 2A-2B. These include transmissive, reflective, and transflective modes.

In reflective or transflective modes, as in FIGS. 1A-1D, the reflective surface (not shown) can be arranged in one or more of the following non-limiting positions: a reflector material on the first substrate; the mesa 104 could be diffusely reflective by comprising a polymer containing reflective features such as TiO$_2$ particles; a reflector material could be deposited on the upper surface of the mesa; or the non-polar fluid 120 could be reflective, for example a low-index oil dispersion that contains a metal-oxide pigment. Numerous other reflective surface arrangements could be envisioned by one skilled in the art of displays and optics.

Figure 1C:
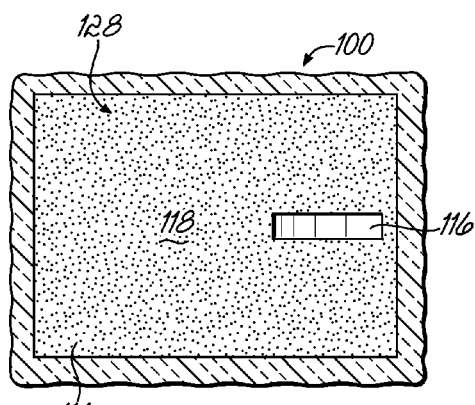
Figure 1D:
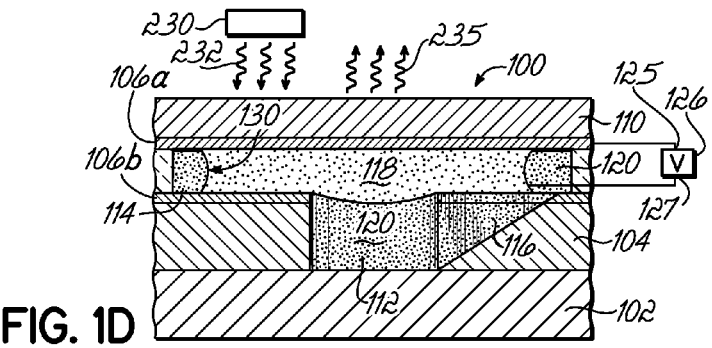
FIG. 1D is a diagrammatic view in partial cross-section of the electrofluidic device of FIG. 1A after the voltage source is activated.

In FIG. 1A and corresponding top-view FIG. 1B, a light source 230 directs light 232 toward the second substrate 110 and the viewable area 128 containing a larger portion of non-polar fluid 120. At least a portion of the light 232 is reflected at the reflective surface (not shown) from the electrofluidic device 100 as light 234 having a first spectral property. Turning now to FIGS. 1C and 1D, after the voltage is provided by the voltage source 126 and the polar fluid 118 is moved into the second region 114, the light 232 will now move through the second substrate 110 and the viewable area 128 containing a larger portion of the polar fluid 118. At least a portion of the light 232 is now reflected from the electrofluidic device 100 by the reflective surface (not shown) as light 235 having a second spectral property. Thus the reflected light 234 of FIG. 1A and the reflected light 235 of FIG. 1D will differ in at one spectra property, which can be intensity, angle, phase, or spectrum.

The desired strength of the spectral properties are determined, at least in part, upon the thickness of the polar fluid 118, or the non-polar fluid 120, within the second region 114. For example, the second region 114 and polar fluid 118 in the second region 114 can be as thin as 1 µm with greater than about 10% by weight of the pigment, but preferably will be greater than about 1 µm such that a strong optical effect will be achieved.

Yet another method of operation, the transmissive mode, is illustrated in FIGS. 2A and 2B. For transmissive mode it is readily understood that one or more materials in the electrofluidic device 100 should be suitably transmissive. Alternatively, the polar fluid 118 may be further hidden from view or the path of light rays in the electrofluidic device 100. This could be achieved, for example, with light absorbing, optical waveguiding, total-internal-reflective, or reflective materials that are arranged on or near the walls defining the geometry of the first region 112. For example, a reflective material can be coated on the sidewalls of the first region 112 and would assist in preserving the visual appearance of the electrofluidic device 100 even if viewed at an angle. Specifically, as in FIG. 2A, a light source 237 directs light 238 toward the first substrate 102 and through the electrofluidic device 100 and the second substrate 110. As the light exits the electrofluidic device 100, the viewable area (not shown) contains mostly the polar fluid 118. Thus, the transmitted light 236 will have a first spectral property based upon the properties of the polar fluid 118 within the viewable area (not shown). Then, in FIG. 2B and in according the principles of the present invention, a stimulus is provided by voltage source 126 and the polar fluid 118 moves from the second region 114 and into the first region 112 such that the viewable area (not shown) contains mostly the non-polar fluid 120. Now, the transmitted light 239 will have a second spectral property based upon the properties of the non-polar fluid 120 within the viewable area (not shown).

Light sources in accordance with FIGS. 1A-1D, and FIGS. 2A-2B can include, when appropriate, external ambient light source such as lamp or sunlight or a laser beam. The light source may be a front-lighting scattering waveguide or a backlighting scattering waveguide as often used for liquid-crystal displays. The light source may be embedded in the present invention, such as an electroluminescent film carried by the same substrate that carries the present invention. Multiple light source locations, spectrums of light, intensities, and incidence angles are possible as the polar fluid and non-polar fluid of the present invention need only differ by at least one optical property. Such differing optical properties include but are not limited to absorption, transmission, refraction, total-internal reflection, optical interference, diffraction, or reflection. In a preferred embodiment of the present invention the light source will be ambient light and the polar fluid containing a pigment in order to modulate absorption of the ambient light.

Figure 3A:
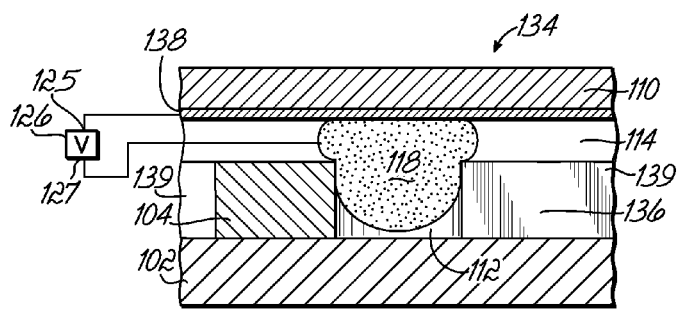
FIG. 3A is a diagrammatic view in partial cross-section of an electrofluidic device according to an alternative embodiment of the invention, with the non-polar fluid omitted.
Figure 3B:
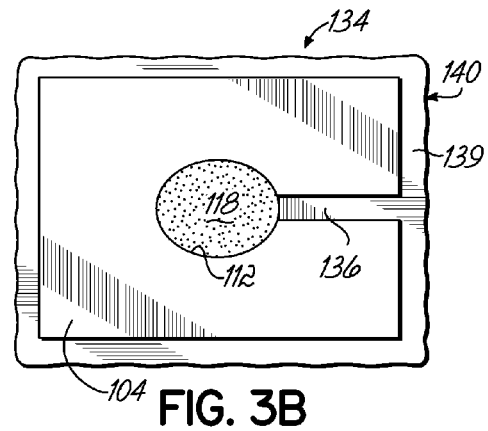
FIG. 3B is a top view of the electrofluidic device of FIG. 3A.

Turning now to FIGS. 3A and 3B where an alternative embodiment of the present invention is illustrated. Therein, an electrofluidic device 134 has an alternate configuration for the duct 136 and the capacitor 138. The duct 136 includes a perimeter portion 139 that substantially surrounds the outer perimeter 140 of the second region 114 (FIG. 3A), thus providing an improved path for flow of the non-polar fluid (not shown) to fill space left vacant by movement of the polar fluid 118. The perimeter portion 139 further provides a means of terminating the advancement of the polar fluid 118 by providing a diverging capillary. That is, as the polar fluid 118 attempts to advance beyond the perimeter 140, the polar fluid 118 will encounter the diverging capillary that requires a stronger electromechanical force than was required for advancement of the polar fluid 118 in the second region 112.

Also further shown in FIGS. 3A and 3B, the capacitor 138 is only located on the surface of the second substrate 110. This could be a useful alternative embodiment if the electrofluidic device 134 were formed on an organic thin-film-transistor array, wherein higher processing temperatures could be used to form a high electrical capacitance hydrophobic-layered capacitor on the second substrate 110 without exposing the first substrate 102 and the features carried thereon to these higher processing temperatures. The upper surface of the mesa 104 or a coating (not shown) applied to the mesa 104 might provide a local contact angle near 90° such that it plays a neutral role in advancement or retraction of the polar fluid. Alternately, the mesa 104 could be coated with a lower temperature processed, and lower capacitance hydrophobic-layered capacitor (not shown) such that applied voltage will cause this lower capacitance capacitor 138 to play a more neutral role in advancement or retraction of the polar fluid.

Figure 4A:
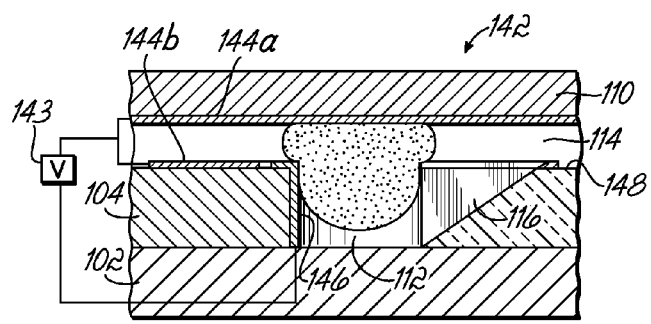
FIG. 4A is a diagrammatic view in partial cross-section of an electrofluidic device according to an alternative embodiment of the invention, with the non-polar fluid omitted.
Figure 4B:
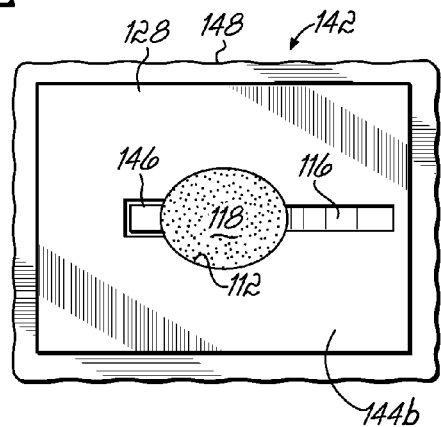
FIG. 4B is a top view of the electrofluidic device of FIG. 4A.

Turning now to FIGS. 4A and 4B illustrating an alternate electrofluidic device 142 embodiment of the present invention. Therein the electrofluidic device 142 includes partially patterned capacitors 144a, 144b and a hydrophobically-coated electrode 146. The hydrophobically-coated electrode 146 includes an electrical conductor, such as gold, that can exhibit hydrophobic behavior, or a non-hydrophobic material, such as aluminum, that is coated with a fluoropolymer or other hydrophobic material that is not substantially electrically insulating. The hydrophobically-coated electrode 146 serves the role of allowing a voltage source 143 connection near the first substrate 102 to remain in electrical contact with the polar fluid 118, even as the polar fluid 118 is fully or partially pulled out of the first region 112 and into the second region 114 by the electromechanical force imparted by one or both capacitors 144a, 144b. For example, the hydrophobically-coated electrode 146 could be connected to the drain of a thin-film-transistor (not shown) residing on the first substrate 102. In a preferred embodiment of the present invention, a suitably electrically insulating hydrophobic dielectric will be formed on most or all features inside the first region 112 and second region 114 of the fluid vessel.

With continued reference to FIG. 4A, the one or more of the capacitors 144a, 144b can be patterned such that advancement of the polar fluid will terminate when it reaches a portion of the mesa 104 or the second substrate 110 that contains an area 148 that is without the hydrophobic dielectric material.

Figure 5A:
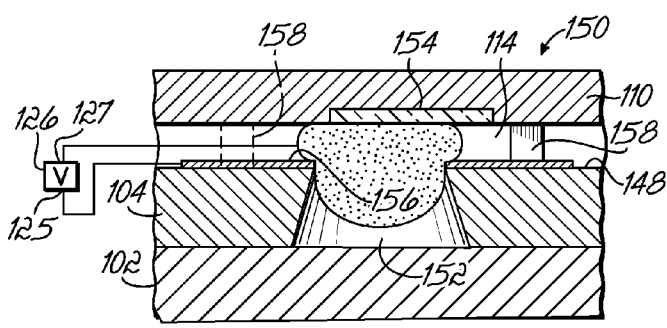
FIG. 5A is a diagrammatic view in partial cross-section of an electrofluidic device according to an alternative embodiment of the invention, with the non-polar fluid omitted.
Figure 5B:
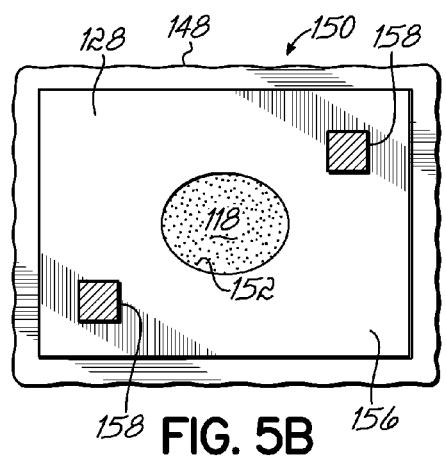
FIG. 5B is a top-view of the fluid vessel of FIG. 5A.

FIGS. 5A and 5B illustrate an alternate electrofluidic device 150 embodiment of the present invention. Therein, the electrofluidic device 150 includes an alternate arrangement of the features previously described herein. However, the first region 152 has at least one geometrically variation that further hides the polar fluid 118 from the visible area 128 of the electrofluidic device 150.

Also shown in FIG. 5A, the duct 154 is fabricated in the second substrate 110 and serves one or more of the functions previously described for the duct 154. The capacitor 156 is located on the mesa surface 104. The spacers 158 contact only a small fractional area of the mesa 104 that is preferably less than about 30% of the viewable area 128. If the spacers 158 are sufficiently small, exhibit suitable static wetting properties, and/or if the spacers 158 exhibit voltage-switchable wetting properties, they can be placed on the mesa 104 and still allow the polar fluid 118 to freely advance into the majority of the second region 114.

Figure 6A:
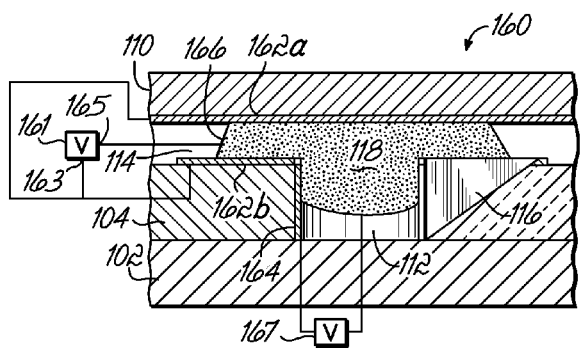
FIG. 6A is a diagrammatic view in partial cross-section of an electrofluidic device according to a bi-stable switch embodiment of the invention, with the non-polar fluid omitted.
Figure 6B:
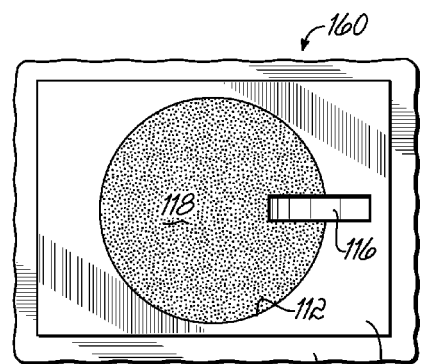
FIG. 6B is a top-view of the fluid vessel of FIG. 6A.

FIGS. 6A and 6B illustrate yet another alternative embodiment of the present invention involving the electrofluidic device 160 that can exhibit bistable switching behavior. The surfaces surrounding the first region 112 or the second region 114 have capacitors 162a, 162b, wherein the coatings covering the capacitors 162a, 16b have a surface energy that impart a small or zero radius of curvature 166 on the polar fluid 118. For example, the capacitor 162a on the second substrate 110 could impart a contact angle of 110° on the polar fluid 118 whereas the capacitor 162b on the mesa 104 could impart a contact angle of 70° on the polar fluid 118. Alternately, the coatings of the capacitors 162a, 162b could impart a contact angle near 90°. The desired effect is reducing the net Young-Laplace pressure of the polar fluid 118 to the point where contact angle hysteresis prevents fluid flow from the second region 114 into the first region 112 at equilibrium. Alternately, this could be achieved by reducing the Young-Laplace pressure using oil and or water-soluble surfactants to suitably lower the interfacial surface tension between the polar fluid 118 and non-polar fluid (not shown) or by using hydrophobic coating surfaces that are chemically or morphologically inhomogeneous or geometrically patterned, thereby exhibiting suitable contact angle hysteresis or contact line friction.

With continued reference to FIG. 6A, the capacitors 162a, 162b and capacitor 164 on the surface of the first region 112 would then impart the electromechancial force to move the polar fluid 118 to different positions in the electrofluidic device 160. In the absence of any applied voltage, the polar fluid 118 could remain in an intermediate state and therefore achieve a bistable gray-scale operation for applications, such as zero-power electronic paper. The capacitors 162a, 162b, 164 are energized as follows. The first terminal 163 of voltage source 161 will electrically connect to one or both capacitor 162a, 162b while a second terminal 165 of the voltage source 161 is connected to the polar fluid 118. A second voltage source 167 will electrically connect to the capacitor 164 and the polar fluid 118 in a similar manner. Thus, use of more than two voltage sources 161, 167 is possible, and the minimum set required for operation of the electrofluidic device 160 is two voltage sources.

Figure 7A:
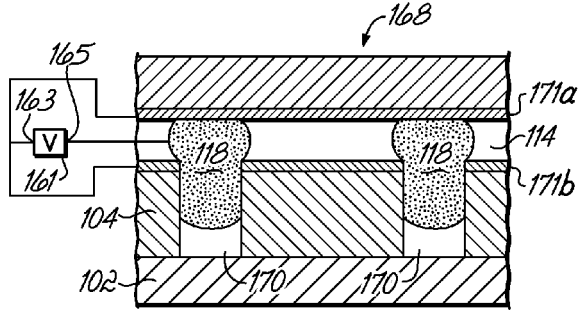
FIG. 7A is a diagrammatic view in partial cross-section of an electrofluidic device according to an alternative embodiment of the invention, with the non-polar fluid omitted.
Figure 7B:
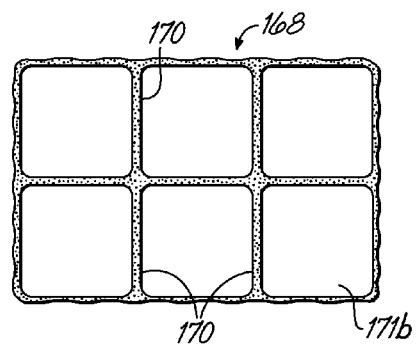
FIG. 7B is a top-view of the fluid vessel of FIG. 7A.

FIGS. 7A and 7B illustrate yet another alternative embodiment of the present invention wherein the electrofluidic device 168 combines one or more functionalities of the duct with the first region 170. Further, the capacitors 171a, 171b can be positioned on either of or both the second substrate 110 or the mesa 104. Although movement of the polar fluid 118 would be less predictable in this alternative embodiment, it provides a very simple means of fabrication and possible utility for applications such as smart windows. In an alternate embodiment of the present invention the geometry of the first region 170 may be optimized beyond that shown in FIGS. 7A and 7B in order to provide more predictable fluid flow.

Figure 8A:
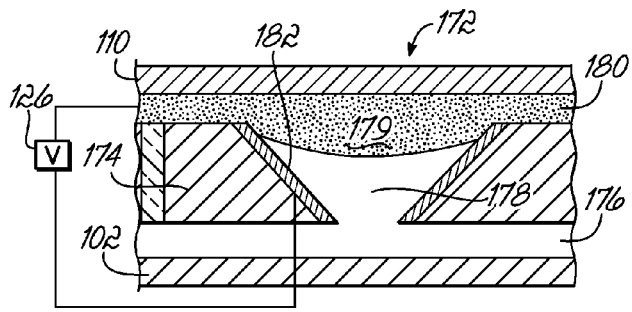
FIG. 8A is a diagrammatic view in partial cross-section of an electrofluidic device according to an alternative embodiment of the invention, with the non-polar fluid omitted.
Figure 8B:
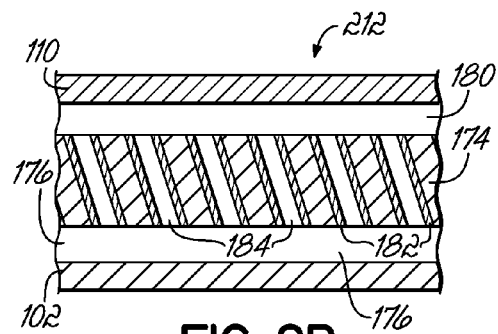
FIG. 8B is diagrammatic view in partial cross-section of an electrofluidic devices according to an alternative embodiment of the invention, with the polar and non-polar fluids omitted.

Turning now to FIGS. 8A and 8B, where two additional embodiments of the present invention are illustrated. Generally, FIGS. 8A and 8B show electrofluidic devices that include a variety of arrangements for the fluid vessel geometry. These alternative embodiments for the fluid vessel operate in the same means described with reference to FIG. 1 and are presented to show that numerous possibilities exist for the first region and second region geometries.

FIG. 8A illustrates one such geometry for electrofluidic device 172. The mesa 174 can be detached from the first substrate 102 and the second substrate 110, thus defining a first region 176 and a second region 180 of the fluid vessel, respectively. The features etched within the mesa 174 can include a shaped capillary 178, wherein the radius of curvature of the shaped capillary 178 increases from the first region 176 to the second region 180. A capacitor 182 can be applied onto the walls of the shaped capillary 178. At equilibrium, a colored non-polar fluid (not shown) would reside in the first region 176 and capillary 178 and a clear polar fluid 179 would reside at equilibrium in the second region 180. The terminals of the voltage source 126 would electrically connect to the polar fluid 179 and the electrode (not shown) of the capacitor 182 and would drive the polar fluid 179 into the capillary 178 and the second region 176 and thus alter the visual appearance of the electrofluidic device 172.

FIG. 8B, illustrates an alternate geometry for the electrofluidic device 212. Therein, the mesa 174 includes several angled capillaries 184, wherein the radius of curvature is constant throughout the angled capillary 184 from the first region 176 to the second region 180. A capacitor 182 would be included upon the walls of each of the angled capillaries 184. If the angled capillaries 184 exhibited semi-diffuse reflection then the visual appearance of the electofluidic device 182 could be altered by movement of a colored non-polar fluid (not shown) as was describe previously with reference to FIG. 8A.

Figure 9A:
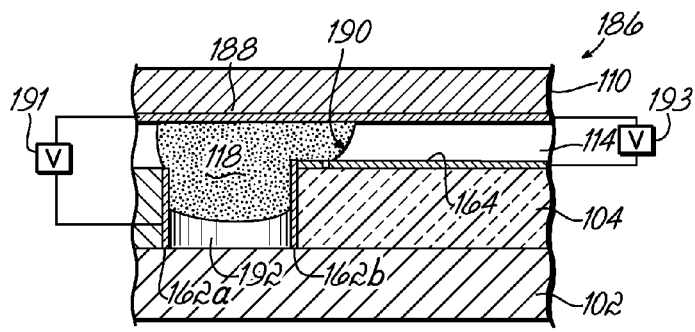
FIG. 9A is a diagrammatic view in partial cross-section of an electrofluidic device according to an alternative embodiment of the invention, with the non-polar fluid omitted.
Figure 9B:
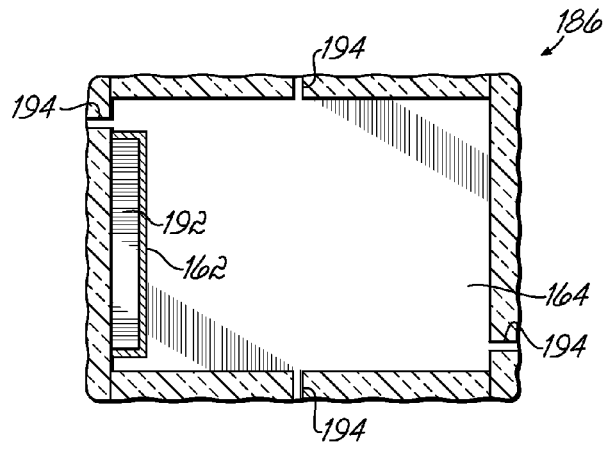
FIG. 9B is a top-view of the fluid vessel of FIG. 9A with the polar fluid omitted.

FIGS. 9A and 9B illustrate an alternative embodiment of the present invention in which the electrofluidic device 186 can exhibit bistable switching behavior and can be driven with one energy source, such as thin film transistor. The second substrate 110 includes a hydrophobically-coated electrode 188, which imparts a small or reduced curvature 190 on the polar fluid 118. For example, the surface on the hydrophobically-coated electrode 188 could impart a contact angle of 90° on the polar fluid 118. The surface of the hydrophobically-coated electrode 188 can further provide a surface with contact angle hysteresis, such that bistable operation is achieved. The desired effect is achieved by reducing the net Young-Laplace pressure of the polar fluid 118 to the point where contact angle hysteresis prevents fluid flow from the second region 114 into an off-set first region 192 at equilibrium. Alternatively, this could be achieved by using oil and/or water-soluble surfactants to suitably lower the interfacial surface tension between the polar fluid 118 and the non-polar fluid (not shown) or by using hydrophobic surfaces that are chemically or morphologically very inhomogeneous, thereby exhibiting large contact angle hysteresis.

With further reference to FIG. 9A, capacitors 162a, 162b, 164 can be operated with two-voltage sources 191, 193, respectively, in a manner similar to that described with reference to FIGS. 6A and 6B. In the absence of any applied voltage, the polar fluid 118 could remain in an intermediate state and therefore achieve a bistable gray-scale operation for applications such as zero-power electronic paper.

If desired, a single thin-film transistor can be used to operate the gray-scale levels in alternative to the two-voltage sources 191, 193. Therein, the hydrophobically-coated electrode 188 and therefore the polar fluid 118 are both held at electrical ground; however, multiple equivalent bias schemes are possible. For the case of a plurality of fluid vessels, each time an image is refreshed, a voltage 193 could be applied to capacitor 164 and thereby cause all polar fluid 118 to fully occupy all second region 114. Then, a thin-film transistor (not shown) that provides the voltage source 191 connected to each capacitor 162a, 162b, can set each electrofluidic device 186 to a distinct gray-scale level by pulling the polar fluid 118 back into the off-set first region 192. Voltage magnitude, pulse-width, fixed charge, or voltage-decay could be used to determine gray-scale states. Alternative biasing schemes include competitive pulling of the polar fluid 118 by the capacitors 162a, 162b, 164. Such schemes also include out-of-phase AC waveforms and the like.

Turning specifically now to FIG. 9B, the electrofluidic device 186 includes narrow conductive paths 194 that allow the capacitor 164 in one or more adjacent fluid vessels to be driven by a single voltage source (not shown). This can eliminate the need for another thin film transistor or individual voltage connection at each device 186 for the case of numerous devices 186 arranged in an array. Because the conductive path 194 is so narrow, the advancement of the polar fluid 118 can in some cases terminate at the entrance of the conductive path 194. Generally, if the path 194 has a width that is on the order of the height of the second region 114, then the advancement of the polar fluid 118 may still be additionally terminated since the diverging capillary would impart an additional small convex radius of curvature on the meniscus of the polar fluid, this additional small radius of curvature perpendicular to the radius of curvature imparted by the second region 114. If desired, a spacer (not shown) can be added on top of the conductive path 194 and also be operable to terminate fluid flow.

With further reference to FIGS. 9A and 9B, the fact that the second substrate 110 carries only a hydrophobically-coated electrode 188 can be advantageous for sealing. For example, a metal-oxide or semiconductor-oxide dielectric could first be deposited on the electrode comprising the capacitor 164. Onto that dielectric, a spacer (not shown) could be printed from a fluid or paste that dries with a rough upper surface. Both the spacer and the dielectric could then be coated with a hydrophobic fluoropolymer. Then the second substrate 110 and the hydrophobically-coated electrode 118 could be placed onto the features carried by the first substrate 102. If the hydrophobic electrode 188 were coated with Microchem SU-8 photo-epoxy (hence not being hydrophobic but mildly hydrophilic) it could then be heated to greater than about 55° C., which melts the SU-8 monomer and bonds with the rough upper surface of the spacer. The SU-8 could then be UV cured to raise its melting point. Thus, a simple high-strength means to adhere a second substrate 110 and features carried to a first substrate 102.

With further reference to FIG. 9B and all other embodiments of the present invention, the use of spacers that are morphologically rough or which present some sort of internal capillary feature (not shown) will promote sticking of an adhesive to the spacers (not shown). This generally requires the adhesive form a contact angle with the hydrophobic material that promotes capillary wetting of the adhesive into rough or capillary features found on or in the spacer (not shown).

Figure 10A:
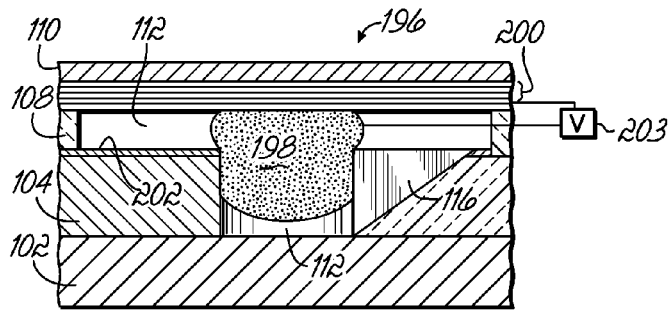
FIGS. 10A and 10B are diagrammatic views in partial cross-section of electrofluidic devices according to a switchable optical microcavity embodiment of the invention, with the non-polar fluid omitted.
Figure 10B:
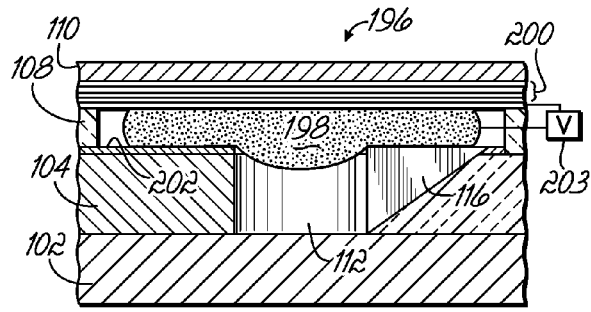

FIGS. 10A and 10B illustrate an alternative embodiment of the present invention, wherein the electrofluidic device 196 switches not by the principle of optical absorption of a colorant, but rather by the principles of a switchable Fabry-Perot cavity or optical microcavity. In this alternative embodiment, the movable MEMs reflector of a conventional interference-modulated structure is replaced by one or more moveable fluids 198 that can be moved in or out of the optical path of light as to cause a phase delay of the light due to the difference in refractive index of the moveable fluid 198. One or more multilayer dielectric films 200 provide half of the Fabry-Perot cavity. In a preferred embodiment a capacitor 202 resting on the mesa 104 is reflective and therefore light passing through the film 200 and the moveable fluid 198 is reflected at the capacitor 202 and directed back through the moveable fluid 198 and the film 200. This reflection forms a complete Fabry-Perot cavity. As shown, the electrofluidic device 196 further includes a voltage source 203 electrically connected to the capacitor 202 and the moveable fluid 198 and is operable in a manner similar to those described previously. This alternative embodiment of the present invention is fully compatible with the various drive schemes, enhancements, manufacturing, and other aspects of a conventional interference modulated display. However the present invention provides much simpler fabrication, the possibility for ease of integration on flexible substrates, and the potential for grayscale or bistable operation within a single device.

Figure 11A:
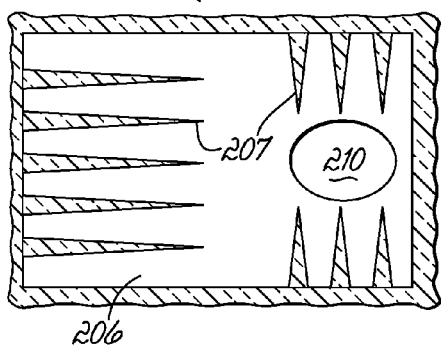
FIGS. 11A and 11B are diagrammatic views in partial cross-section of electrofluidic devices according to alternative embodiments of the invention, both including a patterned capacitor, with the polar and non-polar fluids omitted.
Figure 11B:
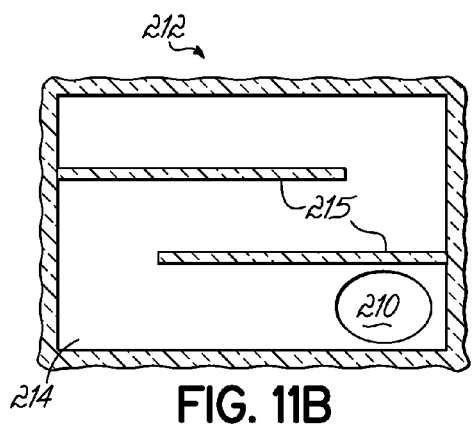

FIGS. 11A and 11B, illustrate an alternative embodiment of the present invention wherein the electrofluidic device includes a patterned capacitor and no duct. Although not shown, the polar fluid and non-polar fluid have similar location and functionality to that described for FIG. 1A. The absence of the duct reduces the freedom of movement of the non-polar fluid to fill space previously occupied by the polar fluid, but such flow would not be entirely prevented and permitted as an alternative embodiment of the present invention.

With specific reference to FIG. 11A the electrofluidic device 204 includes the patterned capacitor 206 and a mesa-exposed portion 207. This will cause the electromechanical force on the polar fluid (not shown) to experience an average decrease as the polar fluid advances onto the larger areas of the mesa-exposed portions 207. In this alternative embodiment, it would therefore require a larger voltage to actuate polar fluid movement to within the mesa-exposed portions 207. As a result, positioning of the polar fluid into the second region (not shown) from the first region 210 could have an analog voltage response similar to that used to electrically operate liquid crystal displays. It should be noted that the patterns shown for the mesa-exposed portion 207 are examples only, could be other geometries such as holes or stripes, and are not to scale in the diagram of FIG. 11A.

Regarding scale, the scale of the patterned capacitor 206 illustrated in FIG. 11A should be roughly on the order or smaller than the height of the first region 210 such that electromechanical force is averaged across the meniscus, otherwise the polar fluid could bifurcate into two or more wetting patterns on the surface. In an alternate embodiment of the present invention, non-abrupt or analog control of the polar fluid position could also be achieved by varying the thickness of the dielectric coating on the capacitor 206.

With specific reference to FIG. 11B, the electrofluidic device 212 is provided with a patterned capacitor 214 and a mesa-exposed portion 215, which can be utilized to cause the advancement of the polar fluid (not shown) to follow a serpentine or other non-circular geometrical expansion. Since any liquid seeks to minimize its surface area, in absence of any patterns on the capacitor 214, or other obstructions or geometrical variations, the polar fluid will fill the second region (not shown) with a viewable geometry that is circular in nature. Thus the alternate embodiment shown in FIG. 11B provides a means by which the polar fluid (not shown) can fill the second region (not shown) in predictable shapes, such as the non-limiting example of a character, letter, number, or symbol.

With reference to FIGS. 1A-11B, a novel method for dosing fluids into one or more electrofluidic devices is provided. The polar fluid 118 would first be filled or vacuum filled into the open features of the fluid vessel. The first substrate 102 and second substrate 110 could be attached or bonded to each other prior to this polar fluid filing, or after this polar fluid filling. Vacuum filling after bonding may be preferred in some cases as it would allow secure bonding of the two substrates 102, 110, possibly even thermal bonding. After the polar fluid 118 is filled between a now adjacent first substrate 102 and second substrate 110, the non-polar fluid 120 would be dosed at the edge of fluid vessel 100, or an array of such. The non-polar fluid 120 would rapidly wet into the second region as Young-Laplace pressure would cause the polar fluid 118 to retract away from the non-polar fluid 120. If the fluids, materials, and geometries are properly optimized, the speed of this retraction would be adequately fast in the second region such that the non-polar fluid 120 would surround the polar fluid 118 in the first region 112 before it is able to de-wet the polar fluid 118 from the first region 112. Therefore a novel, simple, yet powerful means of self-assembled liquid dosing can be achieved for the electrofluidic device.

Figure 12:
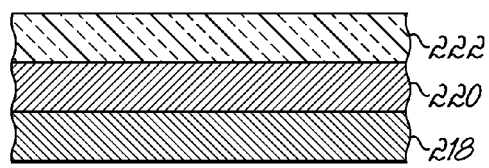
FIG. 12 is a diagrammatic view of layered electrofluidic devices, according to one embodiment of the invention.

With reference to FIG. 12 where multiple electrofluidic devices 216 are layered to form a visual display. This layering allows multiple colors to be controlled through subtractive color filtering. For instance, a first layer 218 could control infrared light whereas a second layer 220 includes a color in the visible.

In an alternative embodiment any number of fluid vessels could be laminated with any number of permanent color filters. For example, a blue switching fluid vessel with a permanent red color filter could provide a switchable red to black coloration. There are multiple configurations to achieve color or spectral changes, those configurations easily envisioned those skilled in the art of display or printing technologies. For example, multiple fluid vessels could be arranged side by side in a pixilated format to form an electrofluidic device, each fluid vessel capable of switching between black and white and each having above it one of a red, green, or blue color filter film. It would be obvious to on skilled in the art of displays that color generation may also extend into the cyan-magenta-yellow color system, as has been a long-standing practice in the printing industry.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept. Within the spirit of the present invention proper fundamental configurations for electrofluidic devices have been described and their applicability and specific design for numerous applications are readily contained within the present invention. Non-limiting examples of specific electrofluidic applications include: adaptive camouflage, tunable color surface, smart windows, electronic paper, electronic displays, active signage, tintable sunglasses, programmable photolithographic equipment, communication systems, biomimetic tools, smart clothing, smart cards, electrotextiles, rollable displays, flexible displays, rigid displays, transmissive displays, reflective displays, transflective displays, emissive displays, reconfigurable key pads, touch screens, electrofluidic sensors, heads-up-displays, microdisplays, and a variety of other existing or new applications utilizing the principles described herein.

The following examples and comparative example illustrate particular properties and advantages of some of the embodiments of the present invention. Furthermore, these are examples of reduction to practice of the present invention and confirmation that the principles described in the present invention are therefore valid.

EXAMPLE 1

A glass substrate was coated with ~100 μm of negative curing Microchem SU-8 photoepoxy, exposed with UV light through a photomask, and developed to create a mesa with a first region and duct that surrounded the majority of the device perimeter. This substrate and features were then angle-evaporation coated with aluminum such that top surfaces were coated but so that the first region and ducts were left substantially uncoated with aluminum. The sample was then coated with ~1 μm of Parylene C dielectric and ~100 nm of Cytonix Fluoropel 1601V hydrophobic fluoropolymer. A top glass substrate was coated with a transparent In2O3 electrode. The top substrate was then coated and patterned with ~5 μm high SU-8 spacers that would later define the second region height to be a similar ~5 µm height. Alternately, the spacers could be directly formed on the first substrate as to alleviate concerns of alignment of the two substrates. The top substrate was then similarly coated with Parylene and Fluoropel. The substrates were sandwiched together and vacuum filled with an aqueous solution containing 10% by weight of red pigment dispersion containing sodium-dodecyl sulfate to reduce the surface tension of the aqueous solution. Next, dodecane oil was introduced to one side of the sandwiched substrates and capillary forces caused the aqueous solution to de-wet all second region features yet remain inside the first region. The device was then sealed and voltage applied across the electrodes, causing the aqueous solution to fill the second region. After the voltage was removed, the aqueous solution rapidly flowed back into the first region.

EXAMPLE 2

A device similar to that described in Example 1 was fabricated, but the liquid movement was terminated not by a surrounding duct, but by a patterned aluminum electrode. Also the aqueous solution utilized not red pigment, but a 10% by weight carbon black dispersion. Also for this second example, Micrcrochem KMPR resist was utilized in place of SU-8, ~100 nm of $Al_2O_3$ was utilized in place of Parylene C, and ~50 nm of Asahi Cytop CTL-809M was used in place of Fluoropel 1601V. This new higher capacitance dielectric resulted in direct-current (0 Hz) operating voltage of <10V.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. An electrofluidic device comprising:
   an electrically-conductive, polar fluid;
   a non-polar fluid that is immiscible with the polar fluid;
   a fluid vessel including a first region and a second region in fluid communication with the first region, the first and second regions containing the polar and non-polar fluids with the non-polar fluid occupying space within the fluid vessel that is not occupied by the polar fluid, the second region including a viewable area through which at least one of the polar and non-polar fluids is visible external to the fluid vessel, and the first region of the fluid vessel having a smaller surface area-to-volume ratio than the second region of the fluid vessel;
   a voltage source operable to selectively apply an electromechanical force to the polar fluid, the electromechanical force effective to transfer at least a portion of the polar fluid from the first region of the fluid vessel to the second region of the fluid vessel;
   a capacitor disposed on at least a portion of the second region of the fluid vessel and electrically coupled with the voltage source, the capacitor having a hydrophobic surface contacted by the polar fluid, the hydrophobic surface configured to provide a first principal radius of curvature of the polar fluid that is convex and that is smaller than a second principal radius of curvature of the polar fluid in the first region of the fluid vessel, such that a portion of the polar fluid will move from the second region of the fluid vessel into the first region of the fluid vessel when the electromechanical force is removed; and
   a duct in fluid communication with the first and second regions of the fluid vessel such that the non-polar fluid displaced from the second region moves through the duct from the second region of the fluid vessel to the first region of the fluid vessel;
   wherein the polar and non-polar fluids differ in at least one optical property such that, as the portion of the polar fluid is moved by the electromechanical force from the first region of the fluid vessel to the second region of the fluid vessel, a spectral property of light transferred through the viewable area changes, and the polar fluid moves to the first region of the fluid vessel when the electromechanical force is removed.

2. The electrofluidic device of claim 1, wherein the second region of the fluid vessel has an outer perimeter, and the duct defines a diverging capillary for at least a part of the outer perimeter of the second region such that, even under the effect of the electromechanical force, the movement of the polar fluid from the first region of the fluid vessel to the second region of the fluid vessel terminates near the duct.

3. The electrofluidic device of claim 1, wherein the duct and the first region of the fluid vessel are unitary.

4. The electrofluidic device of claim 1, further comprising:
   a conductive coating on at least a portion of the fluid vessel, the conductive coating operably associated with the first voltage source and electrically connected in a continuous manner with the polar fluid in the first and second regions as the polar fluid is moved by the electromechanical force.

5. The electrofluidic device of claim 1, wherein the change in the spectral property of the light due to absorption, transmission, refraction, total-internal reflection, optical interference, or reflection.

6. The electrofluidic device of claim 1, wherein the polar fluid within the second region has a minimum transmission of less than about 30% or a minimum reflection of less than about 30%.

7. The electrofluidic device of claim 1, wherein the polar fluid in the second region has a Young-Laplace pressure with a value ranging from about 0.02 $N/cm^2$ to about 10 $N/cm^2$.

8. The electrofluidic device of claim 7, wherein the value of the Young-Laplace pressure is selected such that the polar fluid moves from the second region to the first region at a speed of about 100 micrometers per second or greater.

9. The electrofluidic device of claim 1, wherein the polar fluid includes a polar carrier liquid and a pigment dispersed within the polar carrier liquid.

10. The electrofluidic device of claim 9, wherein the pigment consisting of about 0.1% by weight to about 40% by weight of a dispersion containing a plurality of pigment particles, the plurality of pigment particles having a mean particle size ranging from about 10 nanometers to about 150 nanometers.

11. The electrofluidic device of claim 10, wherein the pigment is selected from the group consisting of azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, derivatives thereof, mixtures thereof, and solid solutions thereof.

12. The electrofluidic device of claim 10, wherein the pigment is selected from the group consisting of antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, metal oxides, mixed metal oxides, derivatives thereof, mixtures thereof, and solid solutions thereof.

13. The electrofluidic device of claim 9, wherein the portion of the polar fluid in the second region has a color saturation corresponding to a minimum Maxwell triangle of (0.3, 0.4), (0.4, 0.3), (0.3, 0.3) as depicted on a 1931 CIE Chromaticity diagram.

14. The electrofluidic device of claim 1 with the proviso that the non-polar fluid will not form an emulsion with the polar fluid.

15. The electrofluidic device of claim 1, wherein the non-polar fluid contains a colorant effective to alter at least one optical property of the non-polar fluid.

16. The electrofluidic device of claim 15, wherein the colorant is selected from the group consisting of azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, derivatives thereof, mixtures thereof, and solid solutions thereof.

17. The electrofluidic device of claim 15, wherein the colorant is selected from the group consisting of metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof.

18. The electrofluidic device of claim 1, wherein the non-polar fluid includes a non-polar carrier liquid and an optical material dispersed within the non-polar carrier liquid, the optical material having a refractive index that differs from the refractive index of the non-polar carrier liquid by at least 0.05.

19. The electrofluidic device of claim 1, wherein the capacitor includes a conductive electrode and a dielectric coating on the conductive electrode, and the first energy source includes first and second terminals, wherein the conductive electrode is connected to the first terminal of the first voltage source and the polar fluid is connected to the second terminal of the first voltage source, the dielectric coating further providing electrical insulation between the first and second terminals of the first voltage source.

20. The electrofluidic device of claim 1, wherein the first and second regions include at least one chemically, morphologically, or electrically inhomogeneous portion, the inhomogeneous portion providing at least one intermediate filling position for the polar fluid in the second region, therefore in the presence of a reduced electromechanical force the polar fluid may occupy at least one intermediate filling position existing between a complete filling of the second region by the polar fluid and no filling of the second region by the polar fluid.

21. The electrofluidic device of claim 1 further comprising:
a light source configured to transfer light through at least the second region.

22. The electrofluidic device of claim 1 further comprising:
a first substrate;
a second substrate; and
at least one spacer located between the first substrate from the second substrate, the at least one spacer separates the first and second substrates and thereby bounding the second region.

23. A visual display comprising a plurality of the electrofluidic devices of claim 22.

24. A bistable electrofluidic device comprising:
an electrically-conductive, polar fluid;
a non-polar fluid that is immiscible with the polar fluid;
a fluid vessel including a first region and a second region in fluid communication with the first region, the first and second regions containing the polar and non-polar fluids with the non-polar fluid occupying space within the fluid vessel that is not occupied by the polar fluid, the second region including a viewable area through which at least one of the polar and non-polar fluids is visible external to the fluid vessel, and the first region of the fluid vessel having a smaller surface area-to-volume ratio than the second region of the fluid vessel;
a first voltage source operable to selectively apply a first electromechanical force to the polar fluid, the first electromechanical force effective to transfer at least a portion of the polar fluid from the second region of the fluid vessel to the first region of the fluid vessel;
a first capacitor disposed on at least a portion of the first region of the fluid vessel and electrically coupled with the first voltage source;
a second voltage source operable to selectively apply an second electromechanical force to the polar fluid, the second electromechanical force effective to transfer at least a portion of the polar fluid from the first region of the fluid vessel to the second region of the fluid vessel;
a second capacitor disposed on at least a portion of the second region of the fluid vessel and electrically coupled with the second voltage source;
a duct in fluid communication with the first and second regions of the fluid vessel such that the non-polar fluid displaced from the second region moves through the duct from the second region of the fluid vessel to the first region of the fluid vessel, wherein the duct and the first region of the fluid vessel are unitary;
wherein the polar and non-polar fluids differ in at least one optical property such that, as the portion of the polar fluid is moved from the first region of the fluid vessel to the second region of the fluid vessel, a spectral property of light transferred through the viewable area changes.

25. A method of making a plurality of electrofluidic devices formed between first and second substrates defining a volume therebetween, each of the electrofluidic devices including a fluid vessel with a first region of the volume and a second region of the volume in fluid communication with the first region, the method comprising:
filling the volume of the fluid vessels with a polar fluid;
introducing a non-polar fluid at an edge of the first and second substrates; and
causing the non-polar fluid to flow between the first and second substrates and into the second region so as to remove at least a portion of the polar fluid from the volume, wherein removing the at least a portion of the polar fluid from the volume is facilitated with a Young-Laplace pressure of the remaining polar fluid in the second region.

26. A method of operating an electrofluidic device, the electrofluidic device including an electrically-conductive, polar fluid, a non-polar fluid that is immiscible with the polar fluid, and a fluid vessel having a first region and a second region in fluid communication with the first region and a duct in fluid communication with the first and second regions, the first and second regions containing the polar and non-polar fluids with the non-polar fluid occupying a space within the fluid vessel that is not occupied by the polar fluid, the method comprising:

applying an electromechanical force to the polar fluid, the electromechanical force exceeding a Young-Laplace pressure imparted by the first region on the polar fluid in the first region of the fluid vessel, and the electromechanical force being operable to move at least a portion of the polar fluid from the first region of the fluid vessel to the second region of the fluid vessel and to move at least a portion of the non-polar fluid from the second region of the fluid vessel, through the duct, and into the first region of the fluid vessel.

27. The method of claim 26 further comprising:

removing the electromechanical force such that the Young-Laplace pressure is operable to move the portion of the polar fluid from the second region of the fluid vessel to the first region of the fluid vessel and the non-polar fluid from the first region of the fluid vessel, through the duct, and into the second region of the fluid vessel.

28. The electrofluidic device of claim 1, wherein the duct includes a geometry configured to improve reproducibility of fluid flow.

29. The electrofluidic device of claim 1, wherein the duct includes a geometry configured to promote fluid flow.

* * * * *

UNITED STATES PATENT AND TRADEMARK OFFICE
CERTIFICATE OF CORRECTION

Page 1 of 2

PATENT NO. : 8,111,465 B2
APPLICATION NO. : 12/677653
DATED : February 7, 2012
INVENTOR(S) : Jason C. Heikenfeld et al.

It is certified that error appears in the above-identified patent and that said Letters Patent is hereby corrected as shown below:

In the Abstract, item (57):

In the second column of the cover page, in line 3 of the Abstract, after "devices", insert --.-- and in line 5, after the second occurrence of "fluid", insert --.-- and in line 7, after "region", insert --.--, and in line 12, after "region", insert --,--.

In the Specification:

At column 3, line number 42, after "is", insert --a-- and in line number 43, change "devices" to --device--.

At column 4, line number 67, change "principle" to --principal--.

At column 5, line number 49, change "require" to --requires-- and at line number 62, before "suitable", delete "source".

At column 6, line number 31, change "principle" to --principal-- and at line number 51, change "is" to --are--.

At column 7, line number 37, before "be", delete "to".

At column 9, line number 34, change "is any" to --in any--.

At column 12, line number 44, before "held", insert --be--.

At column 13, line number 57, change "are" to --is--.

At column 14, line number 18, change "in according" to --according--.

Signed and Sealed this
Twenty-fifth Day of September, 2012

David J. Kappos
*Director of the United States Patent and Trademark Office*

CERTIFICATE OF CORRECTION (continued)
U.S. Pat. No. 8,111,465 B2

At column 15, line number 40, change "geometrically" to --geometrical-- and at line number 59, change "impart" to --imparts--.

At column 16, line number 64, change "8B," to --8B--.

At column 17, line number 6, change "describe" to --described--.

At column 18, line number 23, after "means", insert --is provided-- and at line number 61, after "11B", delete ",".

At column 20, line number 10, after "envisioned", insert --by-- and at line number 15, change "on" to --one--.

At column 22, claim number 5, line number 35, after "light", insert --is-- and in claim number 10, line number 53, change "consisting" to --consists--.

At column 23, claim number 22, line number 65, change "separates" to --separating--.

At column 24, claim number 24, line number 25, change "an" to --a--.